BINARY TESTER FOR LOGIC CIRCUIT SUB-ASSEMBLIES

Filed Dec. 6, 1963 3 Sheets-Sheet 1

INVENTORS
GUY J. GERBIER & JEAN-PIERRE L. BERGER
BY
Abraham A. Saffitz
ATTORNEY

INVENTORS
GUY J. GERBIER & JEAN-PIERRE L. BERGER
BY
Abraham A. Saffitz
ATTORNEY

BINARY TESTER FOR LOGIC CIRCUIT SUB-ASSEMBLIES

Filed Dec. 6, 1963 3 Sheets-Sheet 3

INVENTORS
GUY J. GERBIER & JEAN-PIERRE L. BERGER
BY
Abraham A. Saffitz
ATTORNEY

United States Patent Office 3,286,175
Patented Nov. 15, 1966

3,286,175
BINARY TESTER FOR LOGIC CIRCUIT SUB-ASSEMBLIES

Guy J. Gerbier, 20 Rue de la Paix, Le Perreux-sur-Marne, France, and Jean-Pierre L. Berger, 124 Blvd. Auguste Blanqui, Paris, France Filed Dec. 6, 1963, Ser. No. 328,628
Claims priority, application France, Dec. 7, 1962, 917,940
3 Claims. (Cl. 324—73)

This invention relates to a system for automatically making a full and rapid inspection of plug-in logic circuit sub-assemblies of use in electronic digital computers.

Logic circuit sub-assemblies of this kind are embodied as logic circuits which can include passive linear elements, such as resistors and capacitances, passive non-linear elements, such as diodes, and active elements, such as transistors, assembled, for instance, on printed circuit support cards having on one side terminals for connection to the logical circuits and power-supply terminals enabling such cards to be plugged in a fixed connectors connected to the general wiring of the electronic computer. The logic circuit sub-assemblies are based on a number of designs which provide various groups of logic functions and each of which can be copied in varying numbers. Inspection of all these logic circuit sub-assemblies must make sure that all the constituent parts are satisfactory and correctly connected to one another and to the terminals of their support card. Since a logic circuit sub-assembly is assembled on a support card, the only inspection possible is a systematic check of the signals delivered at each output terminal of the card in response to each signal combination which can be applied to the card input terminals. In cases where there are more than just a few terminals, checking becomes very complicated and consumes considerable time.

This invention has as its subject matter a system adapted to provide automatically a very rapid and systematic check on logic circuit sub-assemblies of the kind specified. According to the invention, the system comprises means for simultaneously applying to the inputs of a support card of any sub-assembly and to the like inputs of a standard card identical to the sub-assembly being tested, all the possible consecutive combinations of binary signals, the system also comprising means adapted to compare, for each such combination, the signals delivered at the like output terminals of the support card under test and of the standard card. According to another feature of the invention, the system comprises, for each access terminal of a support card having the maximum possible number of terminals, a trigger stage, a comparison circuit and a relay having two pairs of contacts, the relay being adapted to connect the access terminal and the like terminal of the reference card in parallel to a predetermined output of the trigger stage via the make contacts of the relay, the relay being adapted to connect the access terminal and the like terminal of the standard card to the two inputs of the comparison circuit via its break contacts. According to another feature of the invention, selective energization of the relays corresponding to the input terminals of the support card and standard card is by way of a program card adapted to each standard card design. According to another feature of the invention, the trigger stages are arranged as a counter and the stepping thereof is controlled by a square-wave-signal generator through the agency of an inhibitor circuit which is cut off by the presence at the output of the comparison circuits of a signal indicating a discrepancy between the output signal associated with the card being tested and the output signal of the standard card.

For a better understanding of the invention and to show how the same may be carried into effect, reference may now be made to the accompanying drawings wherein:

FIGS. 1*a* 1*b* and 1*c* illustrate examples of simple logic circuits;

Figure 1A:
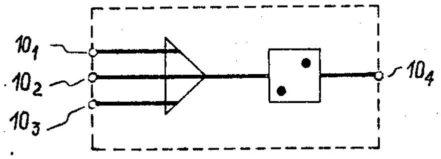
Figure 1B:
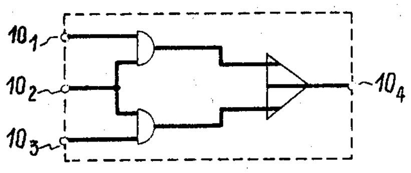
Figure 1C:
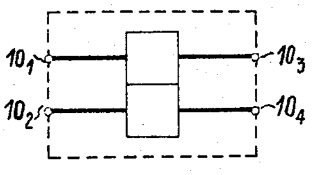

FIGS. 1*a*, 1*b*, 1*c* illustrate by way of example three logic circuits whose functions are different from one another although each has four access terminals $\mathbf{10}_1$, $\mathbf{10}_2$, $\mathbf{10}_3$, $\mathbf{10}_4$. The first logic circuit is shown in FIG. 1*a* and has three inputs and one output. It performs the "or" function and also reverses signal polarity. It can comprise, for instance, three appropriately biased input diodes and one output transistor in a common emitter circuit. The logic circuit illustrated in FIG. 1*b* also has three inputs and one output but performs three functions—two "and" functions and one "or" function—and can comprise only passive linear and non-linear elements. In the trigger stage illustrated in FIG. 1*c*, which performs a memory function and which can comprise, for instance, two active elements such as transistors, the four access terminals are divided into two inputs and two outputs. Many other logic circuits can be devised with four access terminals. For systematic checking of any logic circuit having N terminals by comparison with a standard circuit, the number of tests is greatest when the circuits have N—1 input terminals and one output terminal. Since the position of the output terminal can be random, the number of tests required is $2^N$. Clearly, for a four-access-terminal circuit having three inputs and one output, although only $2^3=8$ tests are required to apply all the possible combinations of binary signals to three given input terminals, a systematic test system must make $2^4=16$ tests for all the possible binary signal combinations to be applied to any three of the circuit terminals taken as input terminals. For instance, in the case of a sub-assembly in the form of a support card having 22 terminals, three of which are power-supplied terminals—i.e., having 19 access terminals—the number of tests required is therefore $2^{19}=524\ 288$.

Figure 2:
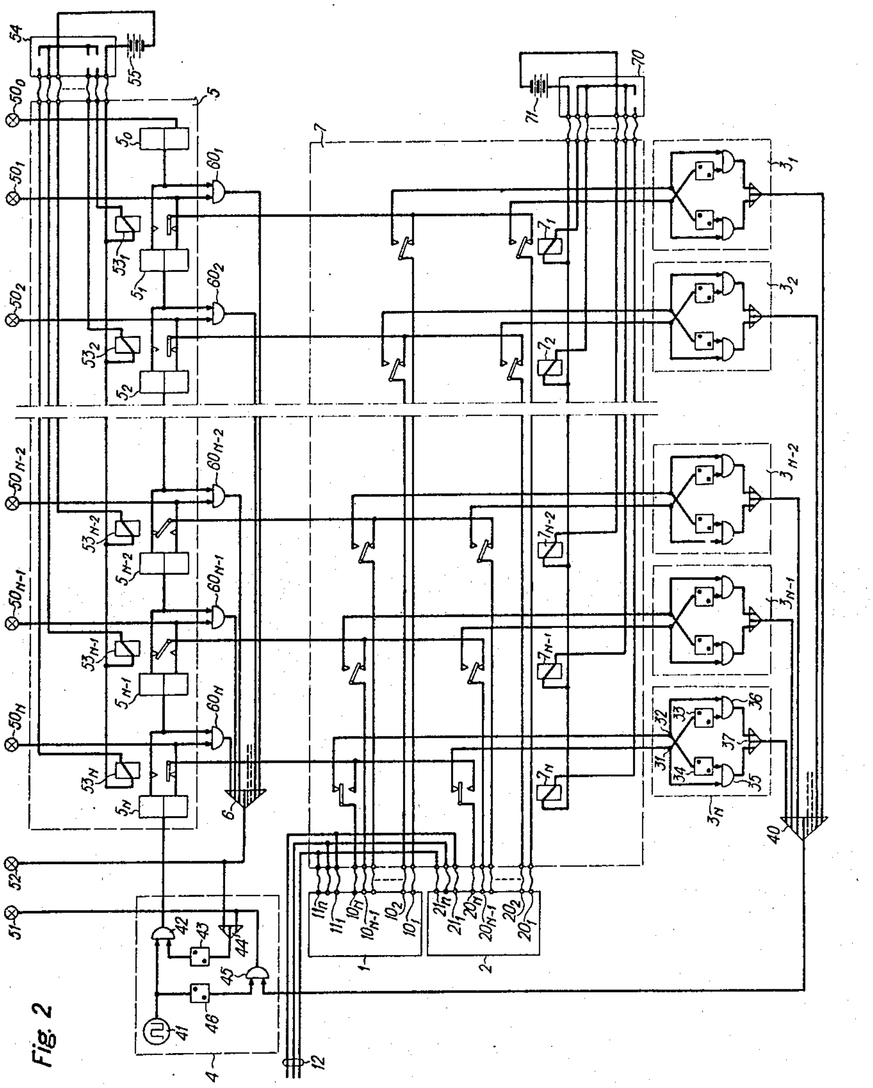
FIG. 2 is a diagram of an automatic tester of logic sub-assemblies for electronic digital computers according to the invention.

FIG. 2 is a diagram of a system for systematically testing sub-assemblies, as 1, comprising at the most N access terminals $\mathbf{10}_1$ to $\mathbf{10}_N$ and *n* power-supply terminals $\mathbf{11}_1$ to $\mathbf{11}_n$ by comparison with standard cards, as 2, of the same design as the card under test and having more particularly the same number of access terminals $\mathbf{20}_1$ to $\mathbf{20}_N$ and power-supply terminals $\mathbf{21}_1$ to $\mathbf{21}_n$ arranged similarly. For each card design to be tested there is a standard card whose assembly and operation have been checked in all the required manners.

A test rig for such sub-assemblies having a number of access terminals less than or equal to N comprises a counter 5 having N+1 trigger stages $\mathbf{5}_O$ to $\mathbf{5}_N$, N comparison circuits $\mathbf{3}_1$ to $\mathbf{3}_N$ and an assembly 7 of N relays $\mathbf{7}_1$ to $\mathbf{7}_N$ having two pairs of contacts for connecting each pair of like access terminals of the cards 1 and 2 either to an output of the corresponding trigger stage $\mathbf{5}_1$ to $\mathbf{5}_N$ or to the two inputs of the corresponding comparison circuits $\mathbf{3}_1$ to $\mathbf{3}_N$. The counter 5 is stepped on by a control circuit 4 comprising a square-wave-signal generator 41 and an output and-gate 42 which is opened by a signal delivered by an inverter 43 in the absence of any signal denoting a fault of the card. The and-gate 42 and inverter 43 therefore co-operate to form an inhibitor circuit.

The cards 1, 2 are so plugged into the test rig that their like power-supply terminals $11_1$ to $11_n$, $21_1$ to $21_n$ are connected in parallel by conductors 12 to appropriate power supplies and their like access terminals $10_1$ to $10_N$, $20_1$ to $20_N$ are respectively connected to one of the two moving armatures of the corresponding relays $7_1$ to $7_N$. Those of the relays $7_1$ to $7_N$ which correspond to the input terminals of the cards 1, 2 are energized from a D.C. source 71 through an auxiliary card 70, known as the program card, which is also plugged into the test rig.

For the convenience of subsequent explanations, in FIG. 2 the terminals $10_1$, $10_2$, $10_{N-2}$, $10_{N-1}$ of the card 1 and the like terminals of the card 2 are taken as the input terminals, and so the relays $7_1$, $7_2$, $7_{N-2}$, $7_{N-1}$ are energized via the card 70 and are shown in the operative position, whereas the relay $7_N$ associated with the output terminals $10_N$, $20_N$ is in the normal position.

The break contacts of the relays $7_1$ to $7_N$ are connected individually to inputs, as 31, 32 of the comparison circuits $3_1$ to $3_N$ whose outputs are connected to the inputs of an or-gate 40. The circuits $3_1$ to $3_N$ are exclusively-or circuits also known as and-not gates comprising an and-gate 35 having one input connected directly to the input terminal 31 and its second input connected via an inverter 34 to the input terminal 32, an and-gate 36 symmetrically connected directly to the terminal 32 and via an inverter 33 to the terminal 31, and an output or-gate 37, so that signals of the same value applied to the input terminals 31, 32 shut the gates 35, 36 whereas different signals cause the or-gate 37 to deliver a signal which passes through the or-gate 40 to the circuit 4 controlling the stepping of the counter 5, so that the gate 42 closes. The two make contacts of each of the relays $7_1$ to $7_N$ are connected in parallel to one or other of the outputs of trigger stages $5_1$ to $5_N$ by way of the moving armature of auxiliary relays $53_1$ to $53_N$ whose break contacts are connected to the One outputs and whose make contacts are connected to the Zero outputs of the corresponding trigger stages $5_1$ to $5_N$. The auxiliary relays $53_1$ to $53_N$ are normally inoperative, and the only ones of them which are energized—by a D.C. source 55 and via an auxiliary card 54—are those which correspond to such inputs of the cards 1, 2 as are trigger-stage inputs, to prevent wrong error signals in a manner to be described hereinafter.

The two outputs of each of the trigger stages $5_1$ to $5_N$ are connected to the two inputs of and-gates $60_1$ to $60_N$ whose outputs are connected to the inputs of an or-gate 6.

The One outputs of the trigger stages $5_1$ to $5_N$ are also connected to pilot-lamps $50_1$ to $50_N$. Also, the One output of the trigger stage $5_O$, which is the highest-order binary element of the counter 5, is connected to a pilot-lamp $50_O$.

The counter control circuit 4 comprises, in addition to the generator 41 and the and-gate 42, an and-gate 45 having one input connected via an inverter 46 to the output of the generator 41 and the other input connected to the output of the or-gate 40, the circuit 4 also comprising an or-gate 44 having one input connected to the output of the gate 45 in parallel with a pilot-lamp 51, a second input connected to the output of the gate 6 in parallel with a pilot-lamp 52, and an output connected via an inverter 43 to an input of the gate 42 whose other input is connected to the output of the generator 41, the output being connected to the symmetrical control input of the input trigger stage $5_N$ of the counter 5.

The system operates as follows:

A card 1 of a particular design which it is required to test, the corresponding standard card 2, the corresponding program card 70 and, where applicable, the auxiliary card 54 are plugged into the test rig, and like inputs of the cards 1, 2 are connected in parallel—via the make contacts of those of the relays $7_1$–$7_N$ which have picked up via the card 70—either to the One output or to the Zero output of the corresponding trigger stage $5_1$–$5_N$, according to whether the associated relay $53_1$–$53_N$ is normal or picked up. Since the relays corresponding to the outputs of the cards 1, 2 have not picked up, the like outputs of the cards 1, 2 are connected to the inputs, 31, 32 of the corresponding circuits such as $3_N$.

It will first be assumed that no auxiliary card 54 is used and, therefore, that, since all the relays $53_1$–$53_N$ are inoperative, the inputs of the cards 1, 2 are connected to the One outputs of the corresponding trigger stages of the counter 5. The same is stepped on by the positive edges of the square signal delivered by the generator 41. These positive edges close the and-gate 45, the same being opened by the negative edges of the square signal. Consequently, the half-period corresponding to the positive alternation of the signal delivered by the generator 41 is associated with the positioning of the counter 5 and with the response time of the logic circuit sub-assemblies to be compared, and signals denoting a discrepancy between the test card and standard card output signals can be received only during the other half-period.

The counter continues to be stepped on for as long as an opening signal is applied to the gate 42. When the counter reaches the number $2_N$, the trigger stage $5_O$ goes to the state One and lights up the pilot-lamp $50_O$ denoting the end of testing. When the signals delivered at two like output terminals $10_i$, $20_i$ are different, the comparison circuit $3_i$ to whose inputs such terminals are connected delivers an error signal which passes through the and-gate 45 while the same is open to be applied to the inverted 43, which shuts the gate 42, and to the pilot-lamp 51 which lights up. The counter remains in the position causing the error signal, such position being indicated by those of the lamps $50_1$, $50_N$ which, having lit, denote the signal combinations applied to the different inputs of the cards 1, 2.

If an input diode of one of the logic circuits of the test card is short-circuited, the fault is shown not by a discrepancy between the output signals from the cards 1 and 2 but by a signal delivered by the gate $60_K$ corresponding to the input where the fault lies. For instance, if the terminals $10_1$, $10_2$ are respectively connected to two input diodes of the same logic circuit, the second diode being short-circuited, then, when amongst all the possible combinations of the respective positions of the trigger stages $5_1$–$5_N$ the trigger stage $5_1$ is in the state One and the trigger stage $5_2$ is in the state Zero, an active signal appears abnormally at the terminal $10_2$ and is applied to the gate $60_2$ simultaneously with the signal delivered by the Zero output of the trigger stage $5_2$. The gate $60_2$ therefore delivers a signal which passes through the gate 6 to the lamp 52 and also, via the or-gate 44, to the inverter 43 which shuts the gate 42.

Figure 3:
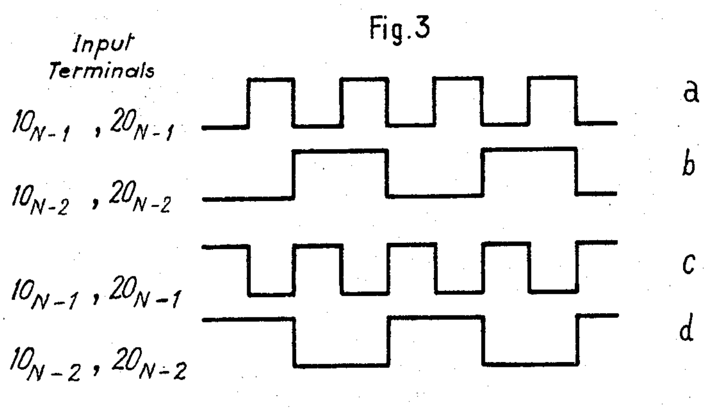
FIGS. 3 and 5 are explanatory diagrams relating to novel aspects of the testing operation, as illustrated in FIGS. 1, 2 and 4.

When two pairs of consecutive input terminals, for instance, $10_{N-1}$, $10_{N-2}$ of the card 1 and $20_{N-1}$, $20_{N-2}$ of the card 2, are connected to the trigger-stage inputs, the signals delivered at the One outputs of the trigger stages $5_{N-1}$ and $5_{N-2}$ appear as shown in diagrams *a* and *b* of FIG. 3 and so may give rise to wrong error signals, for if the signals applied to the inputs $10_{N-1}$, $20_{N-1}$ (diagram *a*) and to the inputs $10_{N-2}$, $20_{N-2}$ (diagram *b*), change simultaneously from the active state, in which they keep off the two elements of the test trigger stage and of the standard trigger stage, to the passive state in which they release both such elements simultaneously, the states taken up by such trigger stages can be random and can be the result of a minor imbalance between the two elements, for instance, the two transistors, of each of them. To obviate this imbalance and the possibility of the wrong error signals arising, the signals applied to the inputs $10_{N-1}$, $20_{N-1}$, and $10_{N-2}$, $20_{N-2}$ are inverted, as shown in diagrams *c* and *d* of FIG. 3, by the relays $53_{N-1}$ and $53_{N-2}$ coming into operation. Since this prevents the control signals applied to the trigger-stage inputs from changing over simultaneously from the active to the passive state, the position of such trigger stages is always fixed without indetermination, and there can be a discrepancy between the output signals only if the test card has a fault.

Figure 4:
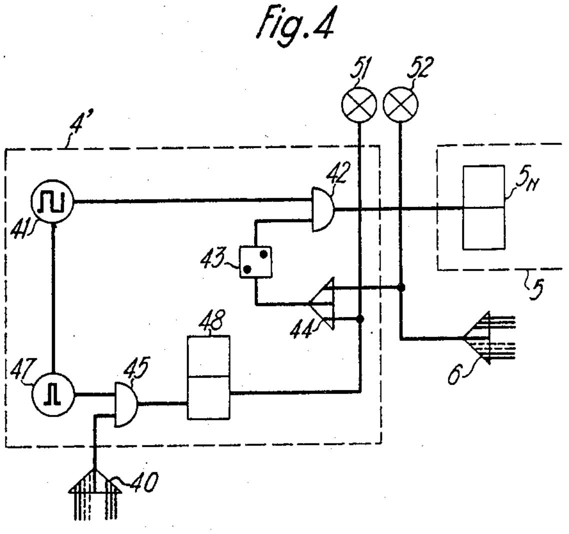
FIG. 4 illustrates a variant of FIG. 2 for checking the response time of the logic circuits of a sub-assembly on test.

In cases where a check is required on the response times of the various circuits of the test cards to make sure that such times do not exceed a desired level less than the period of the generator 41 reduced by the operating time of counter 5, the control circuit 4 shown in FIG. 2 is replaced by the control circuit 4' illustrated in FIG. 4. Also, the counter 5 is preferably arranged to deliver output signals, only one of which changes at a time, for instance, in accordance with the reflected binary code.

In FIG. 4, elements which are the same as in FIG. 2 have like references. The elements of the circuit 4' which have no equivalent in the circuit 4 are a generator 47, which is synchronized with the generator 41 and which delivers pulses of a width greater than half a period of such signals in a suitable phase relationship therewith, and a trigger stage 48 for memorizing error signals.

Figure 5:
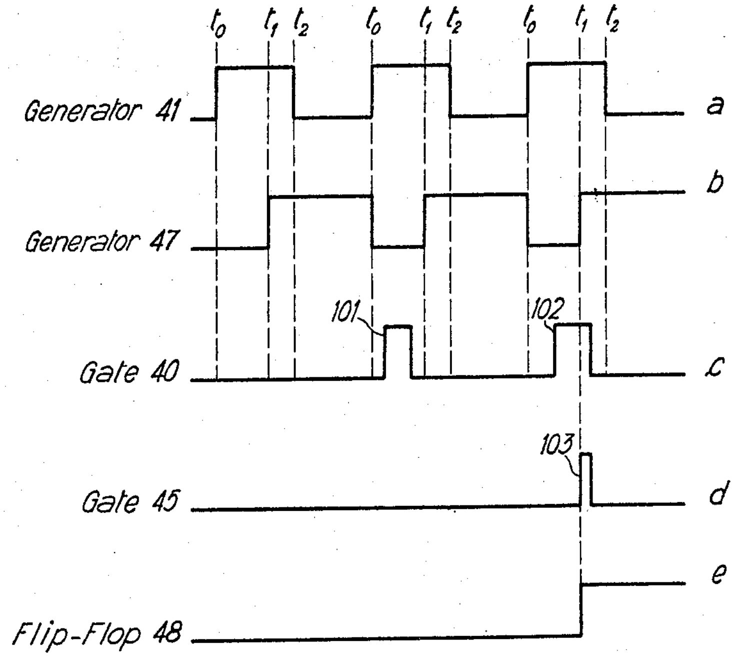

As can be seen in FIG. 5, the leading edge of the pulses delivered by the generator 47 (graph *b*) is staggered from the positive edges of the signal delivered by the generator 41 (graph *a*) by a time $t_0t_1$ equal to the allowable response time for the circuits of the card being tested, with allowance for the positioning time of the counter 5; the rear edge of such pulses is synchronous with the positive edges of the signal delivered by the generator 41.

The pulses delivered by the generator 47 are applied to the gate 45, so that the same opens earlier than in FIG. 2 by an amount of time $t_1t_2$. If two like circuits of the test card and standard card are both devoid of constructional faults but have different response times, a time-error signal 101, 102 appears at the output of the gate 40, as shown by graph *c* in FIG. 5. If the output signals of the two cards are in agreement before the time $t_1$ when the gate 45 is opened as for the signal 101, the test is satisfactory and the counter continues to be stepped on. If the disagreement persists beyond the time $t_1$ and causes an error signal, as 102, at the output of the gate 40, a signal, as 103, passes through the gate 45 (graph *d* in FIG. 5) and operates the trigger stage 48 (graph *e* in FIG. 5) which closes the gate 42 through the agency of the gate 44 and inverter 43. The counter 5 is therefore stopped at the position corresponding to the combination which has caused the error signal, and the pilot-lamp 51 also lights up. To reset the system for normal operation, means (not shown) are required to return the trigger stage 48 to the normal state.

What we claim is:

1. A testing device for logic circuit sub-assemblies of any design according to corresponding standard sub-assemblies and having access terminals including input terminals and output terminals the number of said access terminals being less than or equal to a given maximum number, comprising for each access terminal of a sub-assembly having said maximum number of terminals, a trigger stage, said trigger stages being associated as a binary counter, a comparison circuit formed by an and-not gate having two inputs and one output and a relay having two pairs of contacts, said relay being adapted to connect said access terminal and the like terminal of a corresponding standard sub-assembly in parallel on the one hand to an output of said trigger stage via the make contacts of said relay, on the other hand to an output of said trigger stage via the break contacts of said relay and comprising means for selectively energizing the relays corresponding to input terminals of sub-assemblies of any given design, square-wave-signal generator means for stepping said counter through the agency of an inhibitor circuit which is inhibited by the presence at the output of at least one of said comparison circuits of a signal indicating a discrepancy between the output signal associated with the sub-assembly being tested and the output signal associated with the corresponding standard sub-assembly.

2. A testing device for logic circuit sub-assemblies of any design according to corresponding standard sub-assemblies and having access terminals including input terminals and output terminals, the number of said access terminals being less than or equal to a given maximum number, comprising for each access terminal of a sub-assembly having said maximum number of terminals, a trigger stage having a One output and a Zero output, said trigger stages being associated as a binary counter, a comparison circuit formed by an and-not gate having two inputs and one output, a first relay having two pairs of make and break contacts, a second relay having a mobile armature with a break contact adapted to connect said One output of said trigger stage to said pair of make contacts of said first relay and a make contact adapted to connect said Zero output to said pair of make contacts, said first relay being adapted to connect said access terminal and the like terminal of a corresponding standard sub-assembly in parallel on the one hand to said mobile armature of said second relay via said pair of make contacts, on the other hand to said inputs of said and-not gate via said pair of break contacts, and comprising means for selectively energizing said first relays corresponding to input terminals of sub-assemblies of any given design, means for energizing said second relays corresponding to two consecutive input terminals alloted to the inputs of a logical circuit formed by a trigger stage, and square-wave-signal generator means for stepping said counter through the agency of an inhibitor circuit the inhibiting input of which is connected through an or-gate to the outputs of said comparison circuits.

3. A testing device as set forth in claim 2 wherein the One and Zero outputs of each trigger-stage are connected to the inputs of an and-gate whose output is connected to the inhibiting input of said inhibitor circuit whereby said last mentioned and-gate opens and the stepping-on of said counter stops when a signal applied to an input terminal by the One output of the corresponding trigger stage appears at an adjacent input terminal whose trigger stage is in the Zero state, revealing a short-circuit of a diode connected to the latter terminal.

References Cited by the Examiner

UNITED STATES PATENTS

| | | | |
|---|---|---|---|
| 2,925,591 | 2/1960 | Burkhart | 324—73 X |
| 3,179,883 | 4/1965 | Farrow | 324—73 |
| 3,191,120 | 6/1965 | Tamiya | 324—26 |

RUDOLPH V. ROLINEC, *Primary Examiner.*

WALTER L. CARLSON, *Examiner.*

E. L. STOLARUN, *Assistant Examiner.*